(12) United States Patent
Teng (10) Patent No.: US 12,453,507 B2
(45) Date of Patent: *Oct. 28, 2025

(54) MEMORY IDENTIFICATION AND RECOVERY METHOD AND SYSTEM BASED ON RECOGNITION

(71) Applicant: Robert K F Teng, Arcadia, CA (US)

(72) Inventor: Robert K F Teng, Arcadia, CA (US)

( * ) Notice: Subject to any disclaimer, the term of this patent is extended or adjusted under 35 U.S.C. 154(b) by 1075 days.

This patent is subject to a terminal disclaimer.

(21) Appl. No.: 17/356,681

(22) Filed: Jun. 24, 2021

(65) Prior Publication Data

US 2021/0319877 A1 Oct. 14, 2021

Related U.S. Application Data

(63) Continuation-in-part of application No. 16/141,940, filed on Sep. 25, 2018, now Pat. No. 11,075,002.

(51) Int. Cl.
| | |
|---|---|
| *G16H 20/70* | (2018.01) |
| *A61B 5/00* | (2006.01) |
| *G06F 16/903* | (2019.01) |
| *G06V 10/46* | (2022.01) |
| *G06V 20/40* | (2022.01) |
| *G06V 40/16* | (2022.01) |
| *G06V 40/18* | (2022.01) |

(52) U.S. Cl.
CPC ...... *A61B 5/4088* (2013.01); *G06F 16/90335* (2019.01); *G06V 10/464* (2022.01); *G06V 20/46* (2022.01); *G06V 40/172* (2022.01); *G06V 40/193* (2022.01); *G16H 20/70* (2018.01)

(58) Field of Classification Search
CPC ........ A61M 21/00; G16H 10/60; G16H 20/70
USPC ......................................................... 434/236
See application file for complete search history.

(56) References Cited

U.S. PATENT DOCUMENTS

| | | | |
|---|---|---|---|
| 7,773,097 B2 * | 8/2010 | Merzenich | G09B 5/02 |
| | | | 382/165 |
| 9,993,190 B2 * | 6/2018 | Preminger | A61B 5/16 |
| 10,850,099 B2 * | 12/2020 | Skorheim | A61N 1/36025 |
| 11,526,808 B2 * | 12/2022 | Etkin | G16H 30/40 |
| 11,884,980 B2 * | 1/2024 | Bahado-Singh | G16B 20/20 |
| 2016/0012747 A1 * | 1/2016 | Garrues Remirez | A61B 5/168 |
| | | | 434/236 |
| 2017/0098385 A1 * | 4/2017 | Martucci | A61B 5/4088 |
| 2018/0144189 A1 * | 5/2018 | Tran | G06F 3/0488 |
| 2019/0164013 A1 * | 5/2019 | Chen | G06V 10/75 |
| 2023/0055265 A1 * | 2/2023 | McEwen | A61B 5/4088 |

* cited by examiner

*Primary Examiner* — Kurt Fernstrom
(74) *Attorney, Agent, or Firm* — David & Raymond Patent Firm; Raymond Y Chan (57) ABSTRACT

A memory identification and recovery device, based on recognition, includes a storing means stores memory data, an interaction means interacts with users, a feature marks generation means generates feature marks according the input from the interaction means, a search means searches memory data in the storing means, and a scene enhance means enhances the memory information of the user through utilizing the memory information of other users.

20 Claims, 3 Drawing Sheets

MEMORY IDENTIFICATION AND RECOVERY METHOD AND SYSTEM BASED ON RECOGNITION

CROSS REFERENCE OF RELATED APPLICATION

This application is a Continuation-In-Part application that claims the benefit of priority under 35 U.S.C. § 120 to a non-provisional application, application Ser. No. 16/141,940, filed Sep. 25, 2018, which is incorporated herewith by reference in its entirety.

BACKGROUND OF THE PRESENT INVENTION

Field of Invention

The present invention is related to the field of recognition technology improvement, and more particularly, to a memory identification and recovery method based on recognition.

Description of Related Arts

The present invention is mainly to help in recovery from recognition and memory inability. Currently, most cases of memory inability are caused by Alzheimer disease, which is an insidious onset, progressive, and degenerative nervous system disease with symptoms of the comprehensive clinical manifestations of dysmnesia aphasia, apraxia, lost, visuospatial function deficits, executive dysfunction, and personality and behavior changes. The cause of the disease is unknown yet and the disease is commonly known as the geriatric disease.

The present invention may be implemented through wearable devices to help users with recognition and memory inability. It utilizes saliency detection, automatic semantic image data and shape segmentation, and etc. of artificial intelligence to recognize the user's memory automatically, conduct feature mark generation, and store persons, matters, scenes, and etc. for the memory, so as to retrieve the related persons, matters, scenes, and etc. of the memory according to the memory need of the user himself/herself or the other, which effectively helps the user to restore and recover his/her memory, overcome memory inabilities, enjoy a better quality of life.

The present invention may also be utilized for helping memory inability caused by other nervous system degenerative diseases, such as vascular diseases, frontotemporal diseases, Parkinson's disease, and etc. In addition, it may also be utilized for helping memory inability caused by traumatic brain injury, psychological amnesia, and etc.

SUMMARY OF THE PRESENT INVENTION

An object of the present invention is to provide a memory identification and recovery method based on recognition to solve the technical issues of memory loss and difficulty in recovery support.

The present invention can be implemented through a memory identification and recovery method based on recognition, comprising the steps of:
SI. collecting the data information from the scene of activity through a recognition device;
S2. conducting salient feature extraction to the data information collected from the scene and generating feature marks;
S3, building mapping relations between the generated feature marks and the extracted data information, automatically generating memory information in the database, and storing the information in the database;
S4. inputting related data information for searching;
S5. selecting a corresponding method to search the generated memory information in the database based on the input data information; and S6. determining if there is related data information in the memory data, and retrieving the data information for memory replay and memory recovery if there is or determining that the input information is beyond the information recorded in the database and returning to the step S4 if there is not.

Further technology of the present invention includes: feature marks is generated in the step S2 through a method selected from the group consisting of saliency detection, automatic semantic image segmentation, and combinations thereof.

Further technology of the present invention includes: the step S5 also comprises the step of:
S31. encrypting the memory information generated automatically and transmitting the encrypted memory information to a cloud for big data storage. Further technology of the present invention comprises: the step S6 also comprises the step of:
S61. reinforcing and updating the information of the subject stored in the memory in the database through learning after the corresponded memory recovery was confirmed.

Further technology of the present invention includes: the recognition device of the step SI utilizes auditory sense, visual sense, gustatory sense, touch sense, and smell sense to sense the scene of activity and collect the data information.

Further technology of the present invention includes: the related memory data input in the step S4 comprises keyword, image, and voice for the information of self and others.

Further technology of the present invention includes: the search in the step S5 is conducted through a method selected from the group consisting of artificial intelligence interaction, deep learning, searching, novelty checking, finding, and combinations thereof.

Another object of the present invention is to provide a memory identification and recovery system based on recognition, comprising:
a scene acquisition unit, adapted for collecting the data information from the scene of activity through a recognition device;
a mark generation unit, adapted for conducting salient feature extraction to the data information collected from the scene and generating feature marks;
a mapping and storing unit, adapted for building mapping relations between the generated feature marks and the extracted data information, automatically generating memory information in the database, and storing the information in the database;
an input unit, adapted for inputting related data information for searching;
a search unit, adapted for selecting a corresponding method to search the generated memory information in the database based on the input data information; and
a determination unit, adapted for determining if there is related data information in the memory data, and retrieving the data information for memory replay and memory recovery if there is or determining that the input information is beyond the information recorded in the database and returning to the input unit if there is not.

Further technology of the present invention includes: the mark generation unit generates feature marks through a method selected from the group consisting of saliency detection, automatic semantic image or data and shape segmentation, and combinations thereof.

Further technology of the present invention includes: the mapping and storing unit also comprises:
  an encryption module, adapted for encrypting the memory information generated automatically and transmitting the encrypted memory information to a cloud for big data storage.

Further technology of the present invention includes: the mapping and storing unit also comprises:
  a memory data updating module, adapted for reinforcing and updating the information of the subject stored in the memory in the database through learning after the corresponded memory recovery was confirmed.

Further technology of the present invention includes: the recognition device of the scene acquisition unit utilizes auditory sense, visual sense, gustatory sense, touch sense, and smell sense to sense the scene of activity and collect the data information;
  the input unit utilizes input of keyword, image, and voice for related memory data for the information of self and others; and
  the search unit searches through a method selected from the group consisting of artificial intelligence, deep learning, searching, novelty checking, finding, and combinations thereof.

Another object of the present invention is to provide a memory identification and recovery system based on recognition, comprising:
  a storing means for storing a memory data corresponding to each of said plurality of users, wherein said memory data corresponding to each of said plurality of users comprises a memory information including one or more feature marks, one or more extracted data information, and one or more mapping relations between the one or more feature marks and the one or more extracted data information;
  an interaction means for inputting one or more related data information for a lost memory from the memory data, wherein the one or more related data information includes at least one of voice and image of the user, keywords, characteristics of a memory related to the memory;
  a feature marks generation means for generating one or more searching feature marks according to the one or more related data information of the user;
  a search means for searching the memory information of the user from the memory data of the user according to the one or more searching feature marks, wherein the related information is determined in the memory data, the corresponding data information is retrieved for memory replay and memory recovery; and
  a scene enhance means for enhancing the memory information of a user through utilizing the memory information of other users, wherein said scene enhance means for retrieving the corresponding data information from the memory data of the user and sending to said feature marks generation means, said feature marks generation means for generating one or more enhance feature marks according to the corresponding data information of the user, wherein said search means for searching said memory information of the user from the memory data of other users according to the enhance feature marks, wherein the related data information of other users is determined in memory data, the corresponding data information of other users is retrieved for the user to memory replay and memory recovery.

In a preferable embodiment of the present invention, wherein the one or more feature marks stored in said storing means further comprises one or more personal private feature marks, wherein before the corresponding data information of other users is retrieved for the user to memory replay and memory recovery, the corresponding data information of other users is sent to said feature marks generation means for erasing the personal private feature marks of other users.

In a preferable embodiment of the present invention, wherein the interaction means provides an option of forbidding to access the memory data, wherein if other users selects the option of forbidding to access the memory data, the search means is forbade to access the memory data of each of other users.

In a preferable embodiment of the present invention, further comprising a register means for registering a smart device as a recognition device through identifying the smart device, if a plurality of smart devices is identifying belong to a user, said register means is arranged same user id and different device id to each of the plurality of smart devices respectively.

In a preferable embodiment of the present invention, further comprising one or more smart devices registered as the one or more recognition devices, wherein said one or more recognition devices is configured to recognize one or more data information from a scene of activity of corresponding to the user, including one or more of an environmental information of the scene of activity, an information of a surrounding subject of the scene of activity, an auditory information of the scene of activity, an information of indicators of the scene of activity, a visual information of the scene of activity, a gustatory information of the scene of activity, a tactile information of the scene of activity, a smell information of the scene of activity, an information of frequently appearing subjects of the scene of activity, wherein the one or more data information are holistic data information collected based on an order of time during the collecting of the one or more data information from the scene of activity of corresponding to the user.

In a preferable embodiment of the present invention, further comprising an information acquisition means for collecting the one or more data information from the scene of activity of each of the users through the one or more the recognition devices corresponding to each of the users.

In a preferable embodiment of the present invention, further comprising a conducting means for conducting a salient feature extraction to the one or more data information collected from the scene of activity of each of the users to form one or more extracted data information to each of the users.

In a preferable embodiment of the present invention, further comprising a conducting means for conducting a method to the one or more data information collected from the scene of activity of each of the users to form one or more extracted data information to each of the users, wherein the combination method selected from the group consisting of a salient detecting according to attention of sense organs of the user and an automatic semantic image and shape segmentation according to a degree of human perceptions and relations among the human perceptions.

In a preferable embodiment of the present invention, wherein said feature marks generation means for generating one or more feature marks for the scene of activity for each of the users according to the one or more extracted data information of each of the users.

In a preferable embodiment of the present invention, wherein said feature marks generation means for generating one or more feature marks for the scene of activity for each of the users according to the one or more extracted data information of each of the users.

In a preferable embodiment of the present invention, further comprising a mapping meaning for building mapping relations between the feature marks generated and the extracted data information.

In a preferable embodiment of the present invention, further comprising a mapping meaning for building mapping relations between the feature marks of the user generated and the extracted data information of the user.

In a preferable embodiment of the present invention, further comprising a memory information generation means for automatically generating the memory information according to mapping relations between the feature marks of the user generated and the extracted data information of the user, the feature marks of the user and the extracted data information of the user, wherein the memory information is sent to the storing means for storing.

In a preferable embodiment of the present invention, wherein said scene enhance means further provides data conversion, wherein a related information of data conversion of the user is proved through said interaction means, said scene enhance means obtains data format of conversion and a related memory information of the user, wherein said feature marks generation means generates the search feature marks to said search means, wherein search means searches the memory data of each of other users from said storing means according to the search feature marks and the data format of conversion, wherein if a corresponding memory information of other users and data format of conversion are matched the search feature marks and the data format of conversion, said scene enhance means retrieves the corresponding memory information of other users from said storing means and returns to said interaction means.

Advantages of the present invention includes that the method can helps to enhance memory of the user, recover memory after forget it, recover effectively through recognition technology, improve memory, and retrieve memory quickly after memory loss, which is convenient and efficient.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
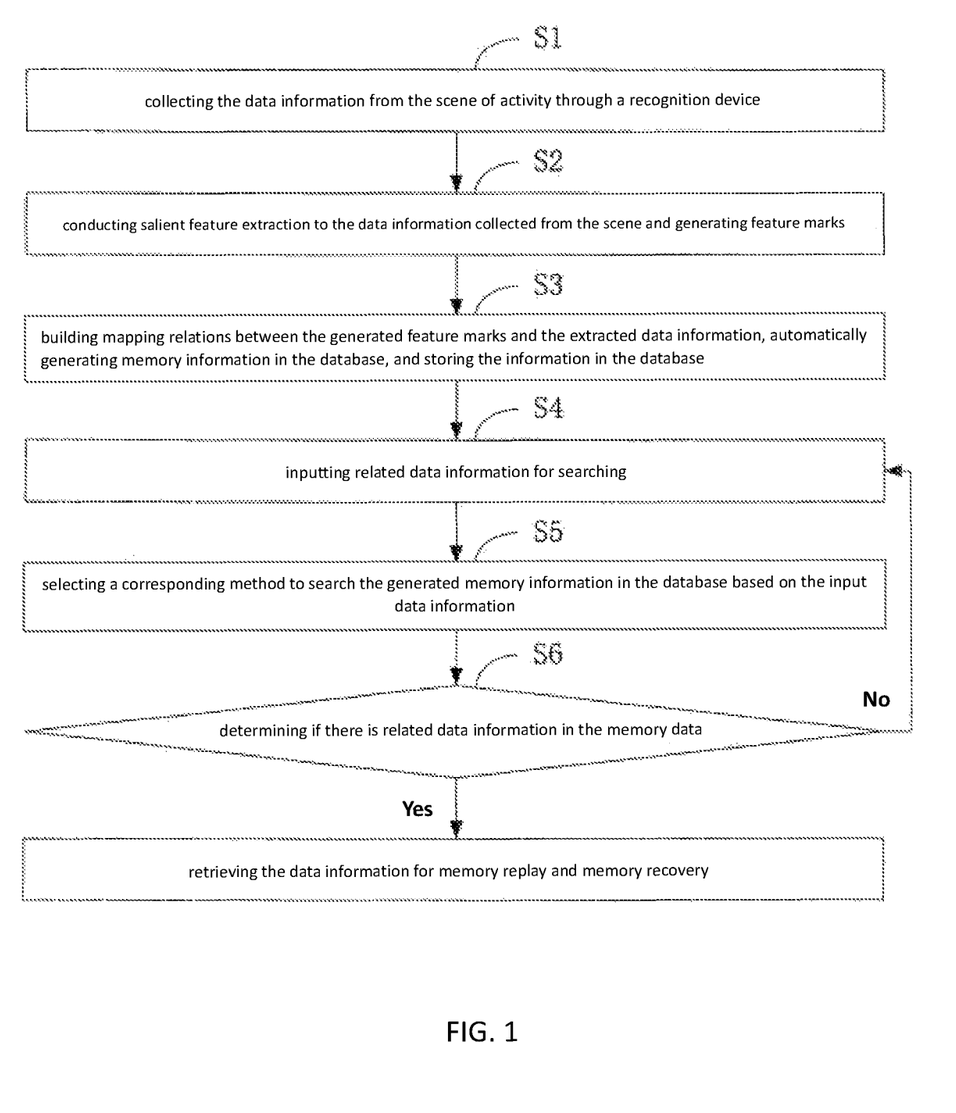
FIG. 1 is a flow diagram of a memory identification and recovery method based on recognition according to a preferred embodiment of the present invention.

FIG. 1 illustrates a flow diagram of a memory identification and recovery method based on recognition according to a preferred embodiment of the present invention, which comprises the following in detail. In step SI, it is to collect the data information from the scene of activity through a recognition device. Namely, a recognition device is utilized to collect data in the scene of the activity of the user. The content of the data being collected is various during the collection, which includes the environmental information of the scene, information of the surrounding subject(s), auditory information, information of the indicators, visual information, gustatory information, tactile information, smell information, information of the frequently appearing subjects, and etc. All types of information are composed based on the order of time in the collection process, so as to produce holistic data information.

In step S2, it is to conduct salient feature extraction to the data information collected from the scene and generate feature marks. That is, it utilizes a combination method of saliency detection and automatic semantic image or data and shape segmentation to mark on the collected data information and extract salient data, so as to generate special marks for the scene and activity. Alternatively, it may also utilize either saliency detection or the automatic semantic image segmentation to conduct the task directly, which includes extract the data and generate marks. Saliency detection and the automatic semantic image segmentation function is mainly according to the degree of human perceptions and the relations among the human perceptions. The human perceptions basically include detection of the movement of pupil, eyeball and muscle around eyes, vision of the eyes, auditory sense of the ears, smell sense of the nose, gustatory sense of the tongue, touch sense of the skin, and etc. The saliency or significance is determined according to the attention of the sense organs. For instance, it may detect movements, such as move and stop, of the eyes, including pupil, eyeball and muscle around eyes, so as to detect the salient substance to the perception of the eyes. When the salient substance and feeling are determined, it will utilize computer semantic image segmentation and computer semantic signal segmentation and identification to recognize them. Besides, other artificial intelligence marking method for recognition may also be utilized.

In step S3, it is to build mapping relations between the generated feature marks and the extracted data information, automatically generate memory information in the database, and store the information in the database. In other words, after the marks are generated, mapping relations will be built between the marks and the extracted data information in a one on one manner. Then the corresponding memory information will be automatically edited and stored in the database. The stored data information will be encrypted and upload to the cloud server for big data storage. This dual storage make the storing of the data safer and more stable.

In step S4, it is to input related data information for searching. That is, in order to recover a lost memory, it may input keywords or other regarding the characteristics of memory that the person wants to recover, so as to conduct a search. Besides, information of memory fragments of the other person may also be input and utilize for searching the mutual memory. Others like voice and image may also be utilized for searching the memory in the database.

In step S5, it is to select a corresponding method to search the generated memory information in the database based on the input data information. It may search the corresponded data information in the database in various forms. For example, it can search in the forms or ways of artificial intelligence, deep learning, searching, novelty checking, finding, and combinations of more than one of them so as to verify the results therebetween. In addition, the found data information can also be utilized for updating and learning.

Step S6. determining if there is related data information in the memory data, and retrieving the data information for memory replay and memory recovery if there is or determining that the input information is beyond the information recorded in the database and returning to the step S4 if there is not. It will update part of the content of the found data information when replaying it. The subject and other information in the memory will be compared and updated with those in the current information through the continuously reinforcement, such that the stored information can better store and preserve the memory and helps to strengthen and recall the memory.

Figure 2:
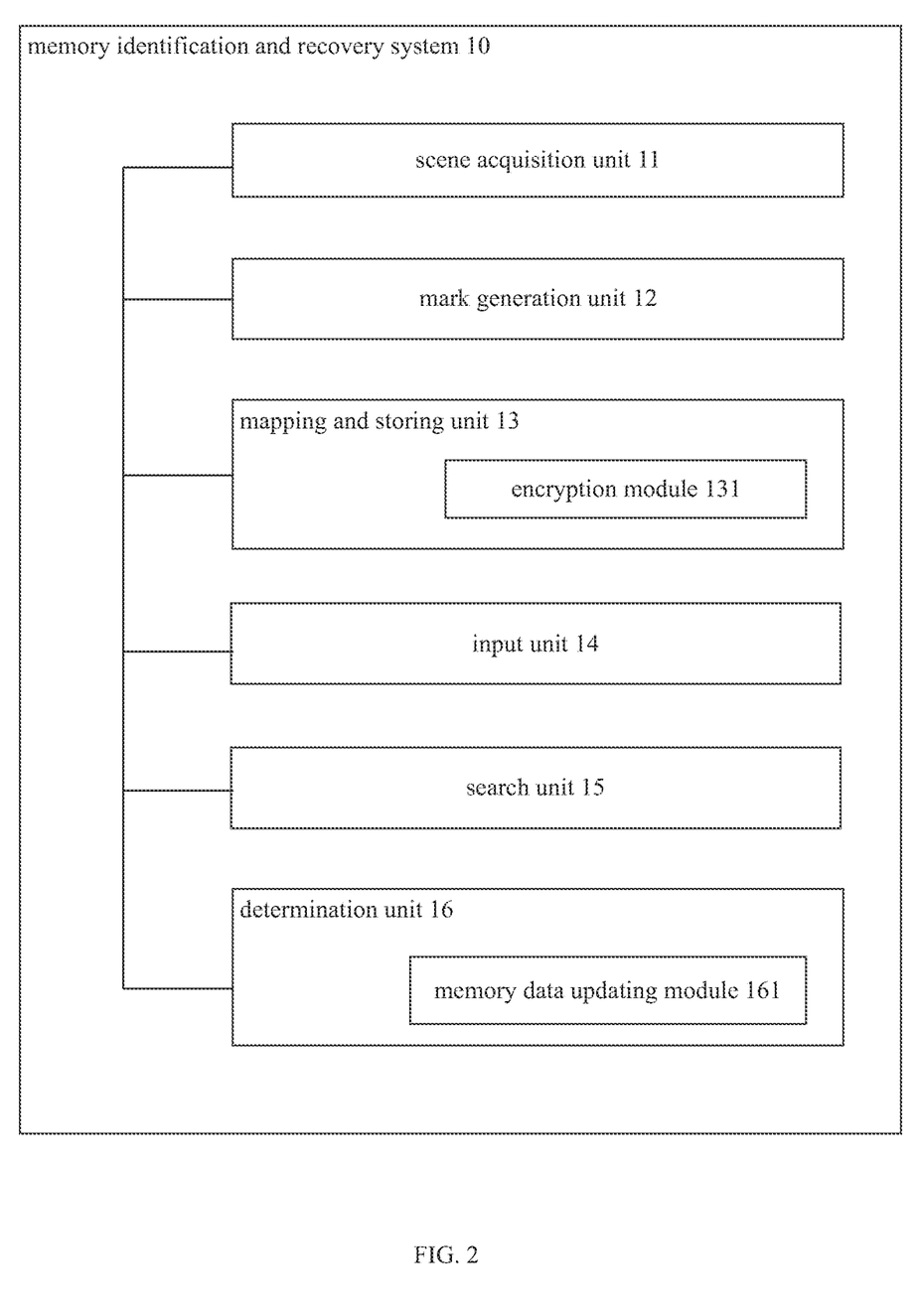
FIG. 2 is a block diagram of a memory identification and recover method based on recognition according to a preferred embodiment of the present invention.

The present invention also provides a memory identification and recovery system 10 based on recognition, comprising:
a scene acquisition unit 11, adapted for collecting the data information from the scene of activity through a recognition device;
a mark generation unit 12, adapted for conducting salient feature extraction to the data information collected from the scene and generating feature marks;
a mapping and storing unit 13, adapted for building mapping relations between the generated feature marks and the extracted data information, automatically generating memory information in the database, and storing the information in the database;
an input unit 14, adapted for inputting related data information for searching;
a search unit 15, adapted for selecting a corresponding method to search the generated memory information in the database based on the input data information; and
a determination unit 16, adapted for determining if there is related data information in the memory data, and retrieving the data information for memory replay and memory recovery if there is or determining that the input information is beyond the information recorded in the database and returning to the input unit if there is not.

The mark generation unit generates feature marks through a method selected from the group consisting of saliency detection, automatic semantic image segmentation, and combinations thereof.

The mapping and storing unit further comprises:
an encryption module 131, adapted for encrypting the memory information generated automatically and transmitting the encrypted memory information to a cloud for big data storage.

The determination unit further comprises:
a memory data updating module 161, adapted for reinforcing and updating the information of the subject stored in the memory in the database through learning after the corresponded memory recovery was confirmed.

The recognition device of the scene acquisition unit utilizes auditory sense, visual sense, gustatory sense, touch sense, and smell sense to sense the scene of activity and collect the data information, The input unit utilizes input of keyword, image, and voice for related memory data for the information of self and others, The search unit searches through a method selected from the group consisting of artificial intelligence interaction, deep learning, searching, novelty checking, finding, and combinations thereof.

The method can helps to enhance memory of the user, recover memory after forget it, recover effectively through recognition technology, improve memory, and retrieve memory quickly after memory loss, which is convenient and efficient.

Figure 3:
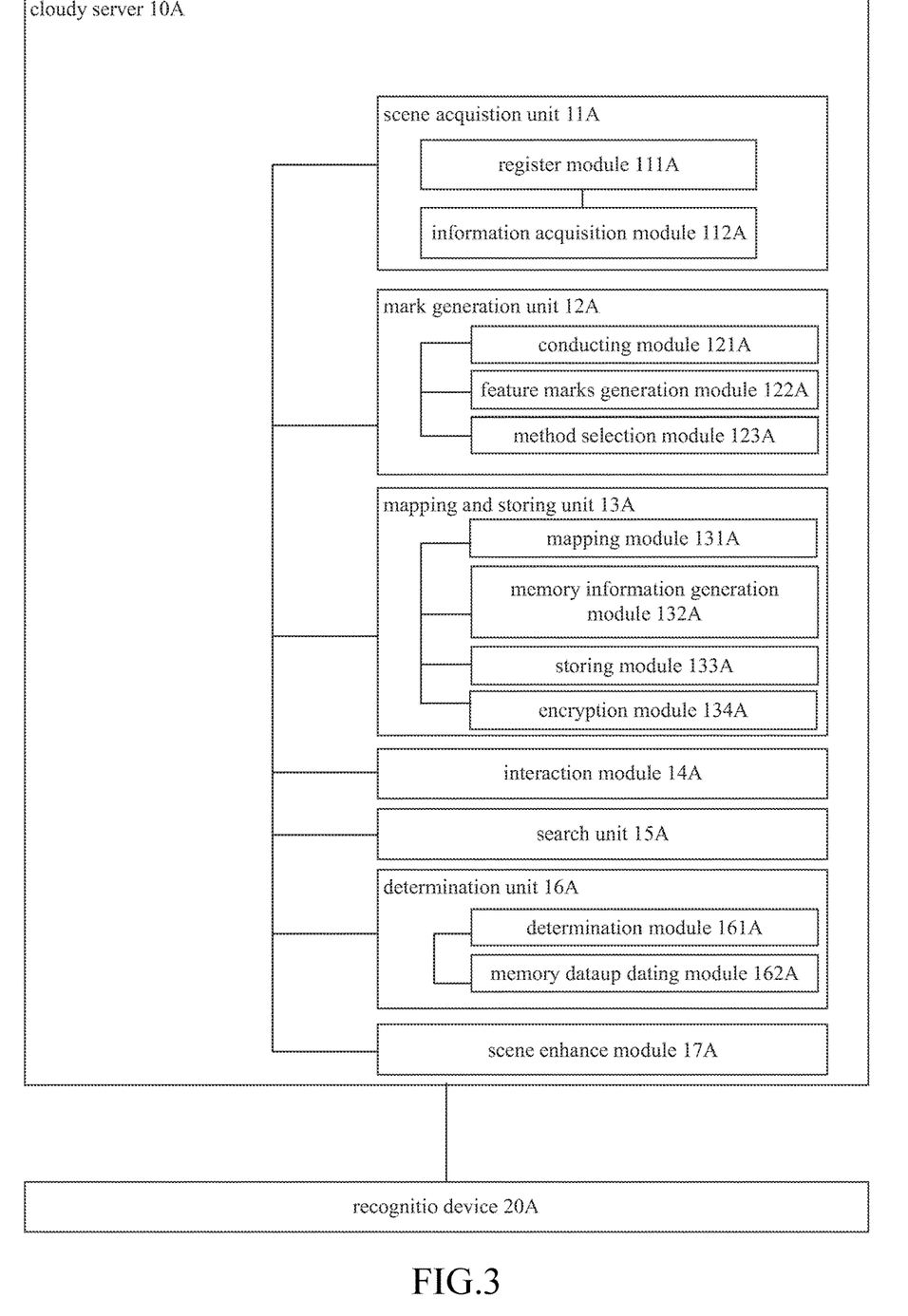
FIG. 3 is a block diagram of a memory identification and recover method based on recognition according to another preferred embodiment of the present invention.

As shown in FIG. 3, another preferred embodiment of a memory identification and recovery system based on recognition of the present invention is illustrated. In this preferred embodiment of the memory identification and recovery system based on recognition utilizes a cloudy structure. In other words, a user uses a recognition device 20A to communicatively connect with a cloudy server 10A. The recognition device 20A is able to collect the data information from the scene of activity. Furthermore, the recognition device 20A is able to collect the data information from the scene of activity through various sensors. For example, environment sensor, auditory sensor, visual sensor, gustatory sensor, tactile information, smell sensor, and so on. More specifically, camera, audio receiver, a pressure sensor, temperature sensor, light sensor, gravity sensor, and so on.

It's worth mentioning that a smart device is able to be utilized as a recognition device 20A. The smart device refers to smart phone, smart wristband, smart glasses and so on. After the smart device is communicatively connected with the cloudy server 10A, the cloudy server 10A is registered the smart device as a recognition device 20A. In other words, the memory identification and recovery system based on recognition is applied in a smart device through the cloudy server 10A. It's worth mentioning that a drone with information collector, such as camera and/or audio receiver, and/or various sensors, is able to be registered as a recognition device 20A through the cloudy server 10A.

The cloudy server 10 comprises an interaction module 14A and a scene acquisition unit 11A. The interaction module 14A is communicatively connected with the scene acquisition unit 11A and the recognition device 20A respectively. The scene acquisition unit 11A is communicatively connected with the recognition device 20A through the interaction module 14A. The scene acquisition unit 11A registers the smart device as the recognition device 10A and acquires the data information of the scene of activity from the recognition device 10A. The scene acquisition unit 11A further comprises a register module 111A and an information acquisition module 112A. The register module 111A identifies the smart device, if the smart device is able to provide the data information from the scene of activity, the smart device is registered as a recognition device 10A. Furthermore, if the user uses multiple smart devices at the same time, the register module 111A identifies each smart device. If each of smart devices is able to provide the data information from the scene of activity, the register module 111A is arranged the same user id and different device id to each of smart devices. The information acquisition module 112A acquires the data information from the scene active from the recognition device 10A.

The cloudy server 10 further comprises a mark generation unit 12A. The mark generation unit 12A is communicatively connected with the scene acquisition unit 11A. The mark generation unit 12A, adapted for conducting salient feature extraction to the data information collected from the scene through the scene acquisition unit 11A and generating feature marks. More specifically, the mark generation unit 12A further comprises a conducting module 121A and a feature marks generation module 122A. The conducting module 121A conducts salient feature extraction to the data information collected from the scene through the information acquisition module 121A. The feature marks generation module 122A generates the feature marks according to the data information processed by the conduction module 121A. The mark generation unit 12A further comprises a method selection module 123A. The method selection module 123A stores a plurality of methods for generating feature marks. The method selection module 123A stores method of saliency detection and method of automatic semantic image segmentation. In other words, the feature marks generation module 122A is able to select a method from the group consisting of saliency detection, automatic semantic image segmentation and combinations thereof.

The cloudy server 10 further comprises a mapping and storing unit 13A, adapted for building mapping relations between the generated feature marks and the extracted data information, automatically generating memory information in the database, and storing the information in the database. The mapping and storing unit 13A further comprises a mapping module 131A, a memory information generation module 132A and a storing module 133A. The mapping module 131A is communicatively connected with the memory information generation module 132A. The mapping module 131A acquires feature marks from the feature marks generation module 122A and extracted data information through conducting module 121A. And then the mapping module 131A building mapping relations between the feature marks and the extracted data information. The memory information generation module 132A is communicatively connected with the mapping module 131A. The memory information generation module 132A edits the memory information automatically according to the mapping relations between the feature marks and the extracted data information in a one on one manner. The storing module 133A stores the memory information in the database as memory data. Furthermore, the mapping and storing unit 13 comprises an encryption module 134A. Before the storing module 133A stores the memory information in the database, the encryption module 134A encrypts the memory information.

The cloudy server 10A further comprises a search unit 15A, adapted for selecting a corresponding method to search the generated memory information in database based on the input data information.

The cloudy server 10A further comprises a determination unit 16A. The determination unit 16A further comprises a determination module 161 A and a memory data updating module 162A. The determination module 161A, adapted for determining if there is related data information in the memory data, and retrieving the information for memory replay and memory recovery if there is or determining that the input information is beyond the information recorded in the data base and returning to the input unit if there is not. The memory data updating module, adapted for reinforcing and updating the information of the subject stored in the database through learning after the corresponded memory recovery was confirmed.

The cloudy server 10A further comprises a scene enhance module 17A. The scene enhance module 17A is able to utilize another user memory information to assist enhance the user memory information. For example, a subject in the memory data of the user stored in the database will help the user to recover the memory, but the subject in the memory data is not enough. In this case, the scene enhance module 17A acquires the memory data of the subject from the database and sends to the feature marks generation module 122A. The feature marks generation module 122A generates one or more searching feature marks. Preferably, the feature marks generation module 122A preferably generates the environment feature mark. In other words, the personal feature doesn't generate at first, unless the user allows the feature marks generation module 122A to generate the personal feature mark. In such a manner, the personal privacy is protected. The feature marks generation module 122A sends the feature marks to the search unit 15A and the interaction module 14A. The interaction module 14A display the feature marks to other users through the recognition device 20A. If another user remembers the feature marks, another user is able to permit the search unit 15A to search the memory data in the database through the interaction module 14A. Another user is able to search the memory data in the database by himself/herself through the search unit 14A. After another user acquires the matched memory data from the database through the search unit 14A, another user is able to forbit provide personal private. The search unit 14A sends the matched memory data to the feature marks generation module 122A. The feature marks generation module 122A erases the personal private feature in the matched memory data of another user. The matched memory data without personal private of another user is sent to the interaction module 14A. The user acquires the matched memory data without personal private of another user through the interaction module 14A.

Furthermore, the scene enhance module 17A is able to convert the memory data to video format or audio format. More specification, the user has a smart watch, smart glasses and smart phone. The smart watch is able to provide a plurality health data, such as pulse data, blood pressure, heart rate and so on. The smart glasses is able to collect the data of the movement of pupil, eyeball and muscle around eyes, vision of the eyes auditory sense of the ears. The smart phone has a lot of sensor which provides the weather data, temperature data, the environment data, and so on. The register module 111 register the smart watch, the smart glasses and the smart phone as the recognition device 10A respectively. When the smart glasses captures the movement of eyeball, the smart glasses send the data of the movement of eyeball to the information acquisition module 112A. At the same time the camera of the smart glasses sends the camera data to the information acquisition module 112A. The conducting module 121 A conducts salient feature extraction to the data of the movement and the camera data collected from the scene through the information acquisition module 121A. The feature marks generation module 122A generates the camera feature marks according to the data of the movement and the camera data processed by the conduction module 121A. The mapping module 131A building mapping relations between the camera feature marks and the extracted data information. The memory information generation module 132A edits the camera memory information automatically according to the mapping relations between the feature marks and the extracted data information. The storing module 133A stores the camera memory information in the database. The scene enhance module 17A is able to convert the camera memory data to audio format. The feature marks generation module 122A erases the data the movement of the eyeball of the user and generates the camera feature marks without personal private. The camera feature marks without personal private is sent to the search unit 15A. Through the interaction module 14A, the other users provide the audio data according to camera feature marks without personal private to the scene enhance module 17A. Through the scene enhance module 17A, the user receives the audio data according to camera feature.

The above is just a preferred embodiment of the present invention, which shall not limit the present invention. Any modification, equivalence, alternative, improvement, and etc. that is within the spirit and principle of the present invention shall be within the scope and extent of protection of the present invention.

One skilled in the art will understand that the embodiment of the present invention as shown in the drawing and described above is exemplary only and not intended to be limiting.

What is claimed is:

1. A computer implemented device for memory identification and recover system base system based on recognition for a plurality of users, comprising:
   a storing means for storing a memory data corresponding to each of said plurality of users, wherein said memory data corresponding to each of said plurality of users comprises a memory information including one or more feature marks, one or more extracted data information, and one or more mapping relations between the one or more feature marks and the one or more extracted data information;
   an interaction means for inputting one or more related data information for a lost memory from the memory data, wherein the one or more related data information includes at least one of voice and image of the user, keywords, characteristics of a memory related to the memory;
   a feature marks generation means for generating one or more searching feature marks according to the one or more related data information of the user;
   a search means for searching the memory information of the user from the memory data of the user according to the one or more searching feature marks, wherein the related information is determined in the memory data, the corresponding data information is retrieved for memory replay and memory recovery; and
   a scene enhance means for enhancing the memory information of a user through utilizing the memory information of other users, wherein said scene enhance means for retrieving the corresponding data information from the memory data of the user and sending to said feature marks generation means, said feature marks generation means for generating one or more enhance feature marks according to the corresponding data information of the user, wherein said search means for searching said memory information of the user from the memory data of other users according to the enhance feature marks, wherein the related data information of other users is determined in memory data, the corresponding data information of other users is retrieved for the user to memory replay and memory recovery.

2. The device, as recited in claim 1, wherein the one or more feature marks stored in said storing means further comprises one or more personal private feature marks, wherein before the corresponding data information of other users is retrieved for the user to memory replay and memory recovery, the corresponding data information of other users is sent to said feature marks generation means for erasing the personal private feature marks of other users.

3. The device, as recited in claim 1, wherein the interaction means provides an option of forbidding to access the memory data, wherein if other users selects the option of forbidding to access the memory data, the search means is forbade to access the memory data of each of other users.

4. The device, as recited in claim 1, further comprising a register means for registering a smart device as a recognition device through identifying the smart device, if a plurality of smart devices is identifying belong to a user, said register means is arranged same user id and different device id to each of the plurality of smart devices respectively.

5. The device, as recited in claim 4, further comprising one or more smart devices registered as the one or more recognition devices, wherein said one or more recognition devices is configured to recognize one or more data information from a scene of activity of corresponding to the user, including one or more of an environmental information of the scene of activity, an information of a surrounding subject of the scene of activity, an auditory information of the scene of activity, an information of indicators of the scene of activity, a visual information of the scene of activity, a gustatory information of the scene of activity, a tactile information of the scene of activity, a smell information of the scene of activity, an information of frequently appearing subjects of the scene of activity, wherein the one or more data information are holistic data information collected based on an order of time during the collecting of the one or more data information from the scene of activity of corresponding to the user.

6. The device, as recited in claim 5, further comprising an information acquisition means for collecting the one or more data information from the scene of activity of each of the users through the one or more the recognition devices corresponding to each of the users.

7. The device, as recited in claim 6, further comprising a conducting means for conducting a salient feature extraction to the one or more data information collected from the scene of activity of each of the users to form one or more extracted data information to each of the users.

8. The device, as recited in claim 6, further comprising a conducting means for conducting a method to the one or more data information collected from the scene of activity of each of the users to form one or more extracted data information to each of the users, wherein the combination method selected from the group consisting of a salient detecting according to attention of sense organs of the user and an automatic semantic image and shape segmentation according to a degree of human perceptions and relations among the human perceptions.

9. The device, as recited in claim 7, wherein said feature marks generation means for generating one or more feature marks for the scene of activity for each of the users according to the one or more extracted data information of each of the users.

10. The device, as recited in claim 8, wherein said feature marks generation means for generating one or more feature marks for the scene of activity for each of the users according to the one or more extracted data information of each of the users.

11. The device as recited in claim 9, further comprising a mapping meaning for building mapping relations between the feature marks generated and the extracted data information.

12. The device as recited in claim 10, further comprising a mapping meaning for building mapping relations between the feature marks of the user generated and the extracted data information of the user.

13. The device as recited in claim 11, further comprising a memory information generation means for automatically generating the memory information according to mapping relations between the feature marks of the user generated and the extracted data information of the user, the feature marks of the user and the extracted data information of the user, wherein the memory information is sent to the storing means for storing.

14. The device, as recited in claim 12, further comprising a memory information generation means for automatically generating the memory information according to mapping relations between the feature marks of the user generated and the extracted data information of the user, the feature marks of the user and the extracted data information of the user, wherein the memory information is sent to the storing means for storing.

15. The device, as recited in claim 1, wherein said scene enhance means further provides data conversion, wherein a related information of data conversion of the user is proved through said interaction means, said scene enhance means obtains data format of conversion and a related memory information of the user, wherein said feature marks generation means generates the search feature marks to said search means, wherein search means searches the memory data of each of other users from said storing means according to the search feature marks and the data format of conversion, wherein if a corresponding memory information of other users and data format of conversion are matched the search feature marks and the data format of conversion, said scene enhance means retrieves the corresponding memory information of other users from said storing means and returns to said interaction means.

16. The device, as recited in claim 1, wherein said scene enhance means further provides data conversion, wherein a related information of data conversion of the user is proved through said interaction means, said scene enhance means obtains data format of conversion and a related memory information of the user, wherein said feature marks generation means generates the search feature marks to said search means, wherein search means searches the memory data of each of other users from said storing means according to the search feature marks and the data format of conversion, wherein if a corresponding memory information of other users and data format of conversion are matched the search feature marks and the data format of conversion, said scene enhance means retrieves the corresponding memory information of other users from said storing means and returns to said interaction means.

17. The device, as recited in claim 15, wherein before said scene enhance means sends the corresponding memory information to said interaction means, said feature marks generation means erasing the personal private feature mark of corresponding to other users in the corresponding memory information.

18. The device, as recited in claim 15, wherein before said scene enhance means sends the corresponding memory information to said interaction means, said feature marks generation means erasing the personal private feature mark of corresponding to other users in the corresponding memory information.

19. The device, as recited in claim 1, further comprising a memory data updating means for reinforcing and updating the corresponding data information to the memory data of the user after the memory recovery of the corresponding user is confirmed through said interaction means.

20. The device, as recited in claim 1, wherein said search means utilizes a search method selected from the group consisting of artificial intelligence, deep learning, novelty checking, finding, and combination thereof.

* * * * *